A. G. HIGGINS.
APPARATUS FOR FLUTING PLASTIC COLUMNS.
APPLICATION FILED JAN. 20, 1912.
1,118,770.
Patented Nov. 24, 1914.
2 SHEETS—SHEET 1.
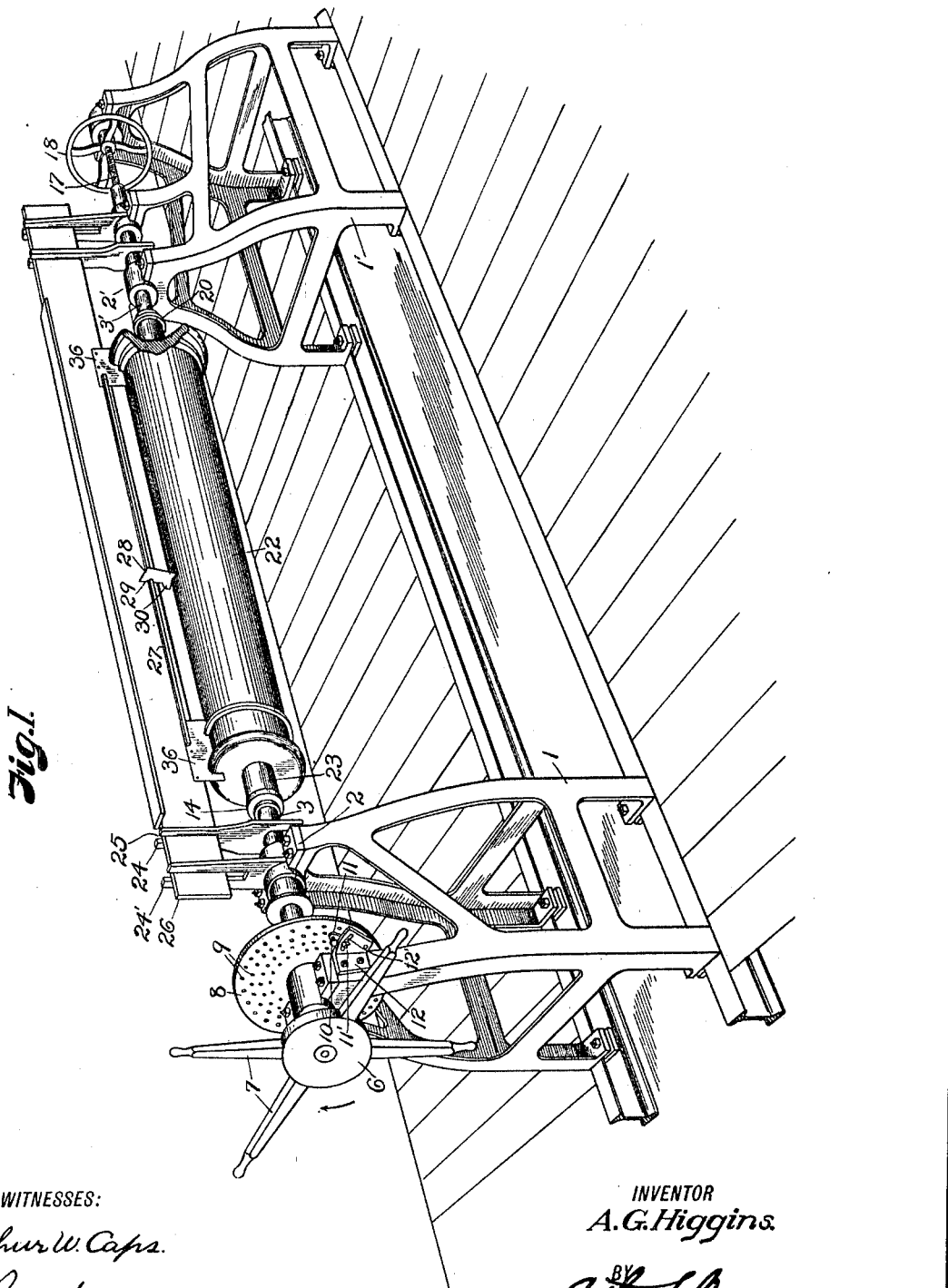
WITNESSES:
Arthur W. Caps.
W. W. Budd
INVENTOR
A. G. Higgins.
BY
Arthur C. Brown
ATTORNEY A. G. HIGGINS.
APPARATUS FOR FLUTING PLASTIC COLUMNS.
APPLICATION FILED JAN. 20, 1912.
1,118,770.
Patented Nov. 24, 1914.
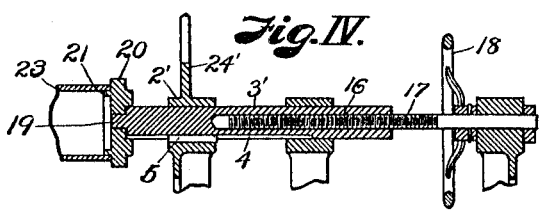
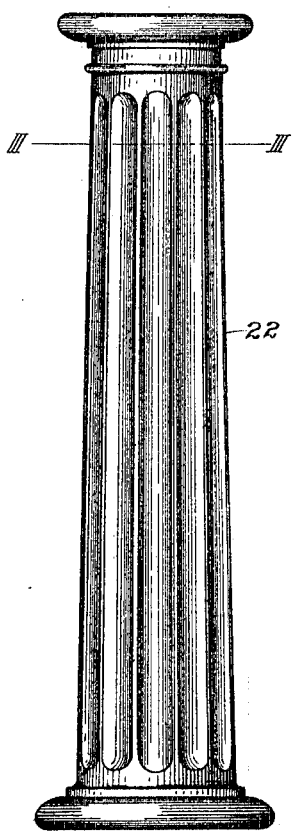
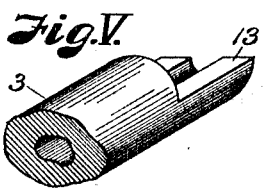
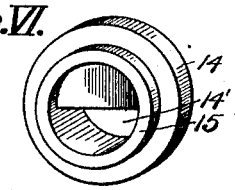
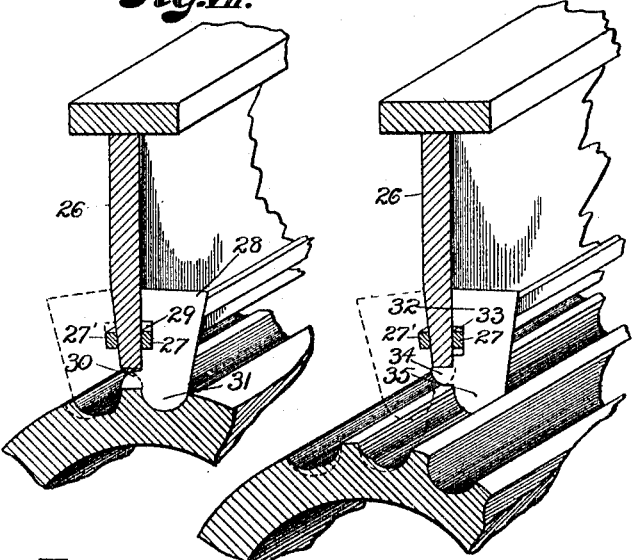
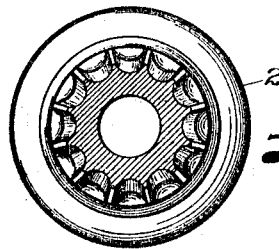
WITNESSES:
Arthur W. Capo.
W. W. Budd.
INVENTOR
A. G. Higgins.
BY
Arthur C. Brown
ATTORNEY

UNITED STATES PATENT OFFICE.

ALBERT G. HIGGINS, OF KANSAS CITY, MISSOURI, ASSIGNOR TO TRUSWALL MANUFACTURING COMPANY, OF KANSAS CITY, MISSOURI, A CORPORATION OF MISSOURI.

APPARATUS FOR FLUTING PLASTIC COLUMNS.

1,118,770.                Specification of Letters Patent.        Patented Nov. 24, 1914.

Application filed January 20, 1912. Serial No. 672,323.

*To all whom it may concern:*

Be it known that I, ALBERT G. HIGGINS, a citizen of the United States, residing at Kansas City, in the county of Jackson and State of Missouri, have invented certain new and useful Improvements in Apparatus for Fluting Plastic Columns; and I do declare the following to be a full, clear, and exact description of the invention, such as will enable others skilled in the art to which it appertains to make and use the same, reference being had to the accompanying drawings and to the letters and figures of reference marked thereon, which form a part of this specification.

My invention relates to an apparatus for fluting plastic columns, and has for its object to provide an apparatus whereby beads and fluting may be quickly and accurately formed on and in a molded or built up column of artificial stone, or the like, before the material of which the column is formed has hardened, the apparatus being especially adaptable for use with columns built according to my United States Patent No. 945,948, of January 11, 1910. In accomplishing this object I have provided the improved details of structure hereinafter described and claimed, the preferred embodiment of which is illustrated in the accompanying drawings, wherein:—

Figure I is a perspective view of the apparatus constructed according to my invention, showing a column in the lathe and a beading tool on the run board. Fig. II is an elevation of a finished column, showing the work of my apparatus. Fig. III is a horizontal section of the column on the line III—III, Fig. II. Fig. IV is a vertical section of the setting of the lathe. Fig. V is an enlarged detail view of the key end of the shaft and Fig. VI a detailed view of the core end for that shaft. Fig. VII is a perspective view of a portion of the run board, showing the bead tool, and showing a portion of the column, illustrating (in dotted lines) the method of marking parts of two flutings at each setting of the dividing head. Fig. VIII is a perspective view of the run board, showing the fluting tool or depth cutter and illustrating (in dotted lines) the finishing of the fluting marked by the bead tool.

While the drawings show a hollow plastic column and a specific lathe structure, the present invention is not limited thereto, as my fluting apparatus may be used on solid columns, and any suitable lathe may be employed, the detailed showing of these auxiliary parts being made merely for the purpose of imparting a clear understanding of the shaping elements.

Referring more in detail to the drawing:—1—1' designate standards, having boxings 2—2' at their upper ends within which the shafts 3—3' are mounted. The shaft 3 is revoluble and the shaft 3' longitudinally slidable, having a key-way 4 into which a feather 5 in the standard 1' is projected. The main shaft 3 has means, preferably comprising a fixed disk 6 and arms 7, whereby it may be manually turned, and is also provided with a dividing head 8 whereby the shaft may be held positively in determined positions. The head 8 preferably comprises a disk, having a number of circular sets of apertures 9, each set having its individual apertures spaced at regular intervals and adapted for receiving a pin 10 which is slidably projected through an arm 11 that is pivotally mounted on a bracket 12 on the standard 1. The bracket has an arcuatile slot 12' and the arms 11 of a thumb nut and bolt 11' by which the arm may be fixed in a desired position relative to the head. The spacing of the head apertures varies in the different sets and the arm 11 may be set so that the pin will register with any of the apertures in that set so that by projecting the pin into the successive apertures, the head and mandrel may be held at regularly spaced intervals. The inner end of the main shaft 3 has a lip 13 adapted for projection into a socket 14' in a core end 14 (Fig. VI) which latter is provided with a mandrel boss 15 on its outer face.

The auxiliary shaft 3' has a threaded end socket 16, and projected into said socket is a screw 17, having a hand wheel 18, by which the shaft is moved longitudinally toward or from the main shaft. On the inner end of shaft 3' is a spindle tip 19, and mounted on said tip is a core end 20, having a mandrel boss 21.

22 designates an artificial stone column which is formed by molding, building up, or in any other manner, but is preferably hollow and formed on a tube core 23, which serves as a mandrel when combined with the lathe mechanism just described, the interior diameter of the mandrel being such that its ends will fit over the bosses of the core ends 14 and 20.

At the ends of the lathe are guides 24 each having a yoked lower end straddling and supported on the shaft 3 or 3' and having a slot 25 in its upper end for receiving and supporting a run board 26. The slots 25 are preferably deep and adapted to receive the board (which is of relative width) snugly to obviate tipping of the board, and the guides are preferably supplemented by guides 24' which may be fixed rigidly on the lathe frame and hold the run board firmly with one of its faces in a plane radiating from the axes of the shafts, and having the edge facing the column parallel to the base of a proposed flute.

A special run board is preferably provided for each style of column, as the flutings of different columns vary and the lower edge of the board should parallel the plane of the base of the flutings to be formed in the column. Fixed to the radial face of the run board is a rail 27, which extends longitudinally nearly throughout the entire length of the board and near the lower edge thereof, being usually set parallel to the plane of the true line of the column, in order that the bead formed by guiding a tool over the rail may be tapered relative to the column fluting, as will presently be described. Inasmuch as the flutings are graduated in width as well as depth from the base to the neck of the column, the shaping tools are made narrower than the base ends flutings and preferably of the width of the neck ends so that to mark and finish each fluting both the marking or bead tool and the fluter or depth cutter must be passed along the column twice to form the proper fluting. In order that the two flutings may be marked or formed at each setting of the lathe, I bevel the opposite face of the run board to a plane radial with the shaft axis and attach a rail 27' thereto directly opposite the first rail 27, so that each tool may be passed along one side of the run board and then along the other to mark or finish portions of the fluting at opposite sides of a bead at each setting of the lathe.

28 designates the bead tool, which is preferably formed of stiff metal and has a slot 29 therein for receiving the rail 27 or 27', and a tongue 30 for projection beneath the guide board when the tool is in operative position. The slot 29 in tool 28 being a little greater in width than the guides 27'—27, in order that said tool may have easy access thereto and free movement thereon. The lower edge of the tongue 30 has the curve of the desired circumferential line of the column so that when moved over the column it will shape the surface thereof, and at its inner end runs into a depending lip 31 which is adapted for marking and partially forming a fluting groove at the side of the bead at the base of the column and forming a finished flute at the neck. The upper edge of the tongue is preferably curved in order to travel free of the bottom of the board and leave the guiding function to the rail 27.

32 designates the fluting tool or depth cutter, which is also preferably formed of stiff sheet metal and has an edge slot 33 for receiving the rail 27, the slot 33 being, however, of greater width than the relative slot on the bead tool in order to afford play of the tool over the rail. Projecting from the edge of the fluting tool, below the slot 33, is a tongue 34, having a straight upper edge adapted for following the lower edge of the guide board. The lower edge of the tongue is preferably cut away to clear the bead and runs into a lip 35, of the same width as the relative lip on the bead tool, but of greater depth than the first lip, in order that it may follow the groove marked in the column, but cut past said groove to its proper depth at each trip along the column.

At each end of the guide board I fix die plates 36 for cutting the circumferential base and top beads as the column is turned in the lathe.

In using the apparatus, a soft column of artificial stone is mounted in the lathe by closing the core ends over the mandrel, a guide board is positioned in the supports 24 and the pin 10 set to control the dividing head for a desired number of flutings for the column. The bead tool is then placed against the first radial face of the run board with the rail 27 in the tool slot 29, and moved longitudinally over the column, the lip cutting into the soft material to mark one side of the fluting and the lower edge of the tongue leveling a bead at the side of such marking. This operation is repeated on the opposite side of the run board, to mark part of an adjacent fluting and complete the column bead. The column is then turned one space and the other half of the second fluting is marked at the first trip along the run board and the first half of a succeeding fluting marked, this operation being continued until a complete revolution of the column has been effected, the last marking being that required for finishing the groove started by the first trip of the tool. As before stated, part only of the base ends of the flutings are marked by the bead tool, while the entire groove is cut at the neck end of the column, for the reason that the flutings are deeper and wider at the base than at the neck of the column.

After the bead has been formed, the tool is replaced by the fluting tool or depth cutter which is moved longitudinally along the run board with the upper edge of its tongue 33 guided by the lower edge of the board. The lip 35 being longer than the corresponding lip on the bead tool cuts deeper into the column and forms the fluting to its proper depth, and, following the plane of the lower edge of the board, may graduate its fluting or diminish its depth from the base toward the upper end of the column. The use of the depth cutter is identical with that of the marker in that it works on the opposite sides of the run board to complete the fluting there marked by the bead tool.

It is apparent that as the column is being revolved the die plates 36 cut the base and top beads by scraping material from the body of the column, such beads being usually roughed in when the body of the column is formed and merely finished by the die plates. It is also apparent that the number of flutings is determined by the position of the dividing head pin and that the position of such pin may be varied by moving the arm on its pivot; the arm being fixed in position for working with a desired set of apertures by tightening the thumb nut 11' on the bracket.

Having thus described my invention, what I claim as new therein and desire to secure by Letters-Patent is:—

1. The combination with means for supporting a column, of tool guiding members arranged in different planes, a tool adapted for guided travel along one of said members and having a contact portion for scraping the column during its travel, to mark a flute, and a separate tool adapted for guided travel along the other member and having a contact portion for scraping the part of the column marked by first named tool.

2. In an apparatus for fluting plastic columns, means for supporting a column, a guide board extending longitudinally relative to the column, and having one edge facing the column parallel to the base of a proposed flute, and adapted for guiding a tool thereover, a rail on the side of the board extending in a plane parallel to the face of the column and different from that of the guide edge, and tools adapted for guided travel along the board edge and the rail for the purpose set forth.

3. In an apparatus for fluting plastic columns, means for supporting a column, a guide board extending longitudinally relative to the column, and having one edge facing the column and adapted for guiding a tool thereover, rails on opposite sides of the board extending in a plane parallel to the face of the column and different from that of the guide edge, and tools adapted for guided travel along the board edge and both of the rails, for the purpose set forth.

4. In an apparatus for fluting plastic columns, means for revolubly supporting a column, a guide board extending longitudinally relative to the column and having a plurality of guide surfaces, one of said surfaces being parallel to the face of the column and another parallel to the base of a proposed flute, and means coöperating with said guide surfaces for forming the flute.

In testimony whereof I affix my signature in presence of two witnesses.

ALBERT G. HIGGINS.

Witnesses:
   JOHN F. WADE,
   LETA E. COOTS.